United States Patent
Shanbhag

(10) Patent No.: US 10,491,494 B2
(45) Date of Patent: Nov. 26, 2019

(54) CAPTIVE PORTAL DETECTION

(71) Applicant: Harman International Industries, Incorporated, Stamford, CT (US)

(72) Inventor: Sandeep Shanbhag, Bangalore (IN)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 15/912,853

(22) Filed: Mar. 6, 2018

(65) Prior Publication Data

US 2019/0158372 A1 May 23, 2019

(30) Foreign Application Priority Data

Nov. 23, 2017 (IN) .............................. 201741042061

(51) Int. Cl.
| | |
|---|---|
| *H04W 76/10* | (2018.01) |
| *H04L 12/26* | (2006.01) |
| *H04L 29/12* | (2006.01) |
| *H04W 84/12* | (2009.01) |

(52) U.S. Cl.
CPC ...... *H04L 43/0811* (2013.01); *H04L 61/2007* (2013.01); *H04W 76/10* (2018.02); *H04L 61/6063* (2013.01); *H04W 84/12* (2013.01)

(58) Field of Classification Search
CPC ... H04W 76/10; H04W 76/02; H04L 43/0811; H04L 61/2007
See application file for complete search history.

(56) References Cited

U.S. PATENT DOCUMENTS

| | | | | |
|---|---|---|---|---|
| 10,057,167 | B2* | 8/2018 | Congdon | ............ H04L 61/2557 |
| 2013/0170435 | A1* | 7/2013 | Dinan | ..................... H04L 45/50 |
| | | | | 370/328 |
| 2014/0003407 | A1* | 1/2014 | Park | ..................... H04W 48/17 |
| | | | | 370/338 |
| 2015/0295885 | A1 | 10/2015 | Congdon | |
| 2017/0111269 | A1 | 4/2017 | Baumgartner | |

OTHER PUBLICATIONS

Teemu Karkkainen et al: "Enabling 1-14 ad-hoc-style communication in public WLAN hot-spots", Challenged Networks, ACM, 2 Penn Plaza, Suite 701 New York NY 10121-0701 USA, Aug. 22, 2012 (Aug. 22, 2012 pp. 31-38, XP058009256.
Donnelly M Gullen Painless Security M: "Captive Portal Detection and Interaction; daft-donnelly-capport detection-00.txt", Captive Portal Detection and Interaction; Draft-Donnelly-Capport Detection-OO.TXT: Internet-Draft: Captive Portal WG, Internet Engineering Task Force, IETF; Standardworkingdraft, Internet Society (ISOC) 4, Rue Des Falaises CH-1205 Geneva, Switzerlan, Mar. 14, 2017 (Mar. 14, 2017). pp. 1-13, XP015124564.

* cited by examiner

*Primary Examiner* — Wei Zhao
(74) *Attorney, Agent, or Firm* — Angela M. Brunetti

(57) ABSTRACT

A method for detecting a captive portal on a Wi-Fi network in which a device generates a random private IP address and attempts a TCP connection on HTTP port 80 and HTTP port 8080. Upon an unsuccessful TCP connection a determination is made that no captive portal is associated with the Wi-Fi network and upon a successful TCP connection, a determination is made that a captive portal is associated with the Wi-Fi network.

20 Claims, 3 Drawing Sheets

CAPTIVE PORTAL DETECTION

CROSS REFERENCE

Priority is claimed to application Ser. No. 201741042061, filed Nov. 23, 2017 in India, the disclosure of which is incorporated in its entirety by reference. This application is also related to U.S. application Ser. No. 15/912,827 titled "Internet Reachability Detection And Internet High Availability For Multi-Homed Network Devices," filed simultaneously herewith, that claims priority to application serial. no. 201741042024 filed Nov. 23, 2017 in India.

TECHNICAL FIELD

The inventive subject matter is directed to a method for captive portal detection.

BACKGROUND

Captive portals are used by venues that provide free Wi-Fi hot spots for end users. The captive portal is a Web page that the end user is obligated to visit and interact with before access to free Wi-Fi is made available. Example venues may be, but are not limited to, corporate offices for guest login, airports, hotels, coffee shops, etc. A captive portal enables a network administrator to allow authorized users Internet access. In a captive portal network the Wi-Fi authentication is always Open Authentication and real user authorization is carried out through the Web page where the end user interacts to enter login credentials.

One of the most widely used implementation mechanisms is HTTP redirection. Using HTTP redirection, a gateway on an AP network (or the AP itself with Captive Portal support) hijacks an HTTP request from a connected STA and responds with a redirected URL in the HTTP response. Following this, the HTTP browser on the STA (Wi-Fi client device) opens the redirected URL containing a captive portal login Web page.

When a device, such as a mobile phone or laptop, running a particular Operating System (OS) connects to a Wi-Fi network with open authentication, the OS on the device carries out steps to detect whether or not the network has a captive portal. The device OS sends out a HTTP-GET request to a corresponding special website hosted by the venue. There is an expected response the device OS knows it is expected to receive when accessing the special website. When the OS device receives the HTTP-GET response, it compares the content of the special website with the expected response. If the content matches, the device OS concludes that there is no captive portal on the Wi-Fi network that it is connected to. When the content does not match, the device OS concludes that there is a captive portal on the Wi-Fi network. This occurs because of the redirection of the HTTP-GET request from the device by the captive portal on the network. The captive portal login page is sent as a response to the HTTP-GET request from the device. The end user can then login with credentials.

The method described above has several drawbacks. Operating System companies are required to host special websites on the Internet which requires cost to set up and maintain to ensure the website is always up and running. The detection mechanism is based on HTTP protocol and therefore may not be suitable for small embedded devices, such as wearables or Internet of Things (IOT) devices, which typically operate without HTTP protocol. The method relies on HTTP protocol exchange between a host and a hosted HTTP server and is time consuming. Carrying out an HTTP protocol exchange for every Wi-Fi connection also adds traffic to the Internet.

There is a need for an efficient method for captive portal detection.

SUMMARY

A method for detecting a captive portal on a Wi-Fi network, the method is carried out on a device connected to a Wi-Fi network. An Internet Protocol (IP) address is acquired from a dynamic host configuration protocol on the Wi-Fi network and set as a default gateway to Internet. The device generates a random private IP address and attempts a TCP connection, to the random private IP address, on HTTP port: 80 and/or HTTP port 8080. Upon an unsuccessful TCP connection to the random private IP address, a determination may be made that a captive portal has not been detected. Upon a successful TCP connection to the random private IP address, a determination may be made that a captive portal has been detected.

The random private IP address is not associated with a subnet of the Wi-Fi network. Upon a determination that a captive portal has been detected, an end user of the device is notified about the captive portal. In order to verify the captive portal detection, the method may be applied using a plurality of random private IP addresses that are not associated with a subnet of the Wi-Fi network.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DETAILED DESCRIPTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Any one or more of the servers, receivers, or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like. Connecting and networking servers, receivers or devices may include, but are not limited to, SATA, Wi-Fi, lightning, Ethernet, UFS, 5G, etc. One or more servers, receivers, or devices may operate using a dedicated operating system, multiple software programs and or platforms for interfaces such as graphics, audio, wireless networking, enabling applications, integrating hardware of vehicle components, systems, and external devices such as smart phones, tablets, and other systems to name just a few.

Figure 1:
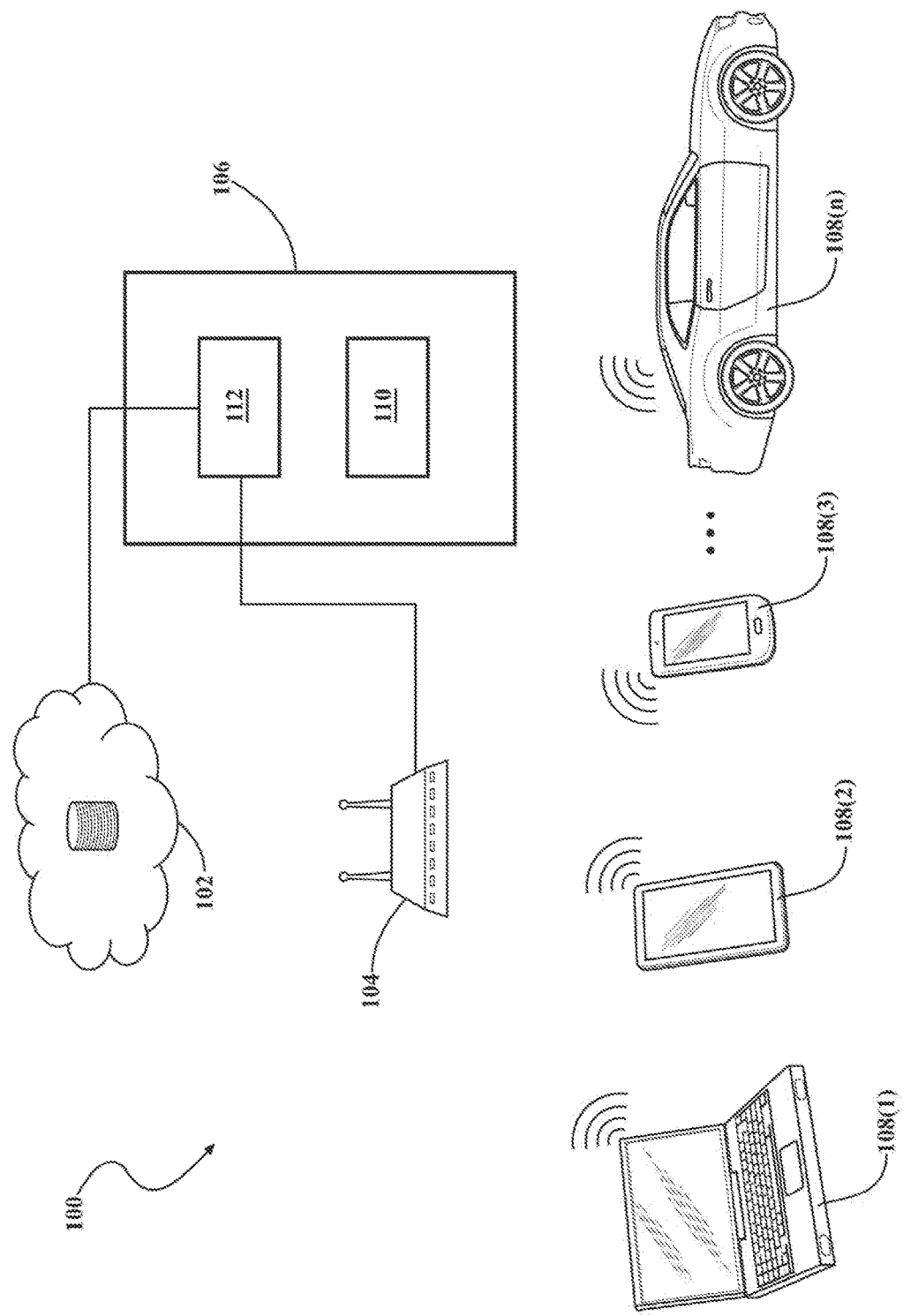
FIG. 1 is a block diagram depicting Wi-Fi access to Internet for a Wi-Fi hotspot in a captive portal network.

FIG. 1 is a block diagram 100 depicting Wi-Fi access to Internet 102 for a Wi-Fi hotspot 104 in a captive portal network 106. Any one of several devices 108(1), (2), (3) . . . (n) such as a laptop, tablet, mobile phone, connected vehicle, a head unit in a vehicle, or other connected, embedded device such as a wearable or IoT device may access the Wi-Fi hotspot 104. The captive portal network 106 includes a captive portal server 110 and a Wi-Fi network controller 112. A device attempts connecting to the Internet through the Wi-Fi hotspot. The captive portal network redirects Hypertext Transmission Protocol (HTTP) traffic from the device to the Internet or to any other subnet to the captive portal server running on HTTP Port: 80 or HTTP Port: 8080. HTTP protocol is based on Transmission Control Protocol (TCP). In order for the HTTP redirection to take place, the device's TCP connection takes place with the captive portal server rather than a server associated with an HTTP server of the website.

Figure 2:
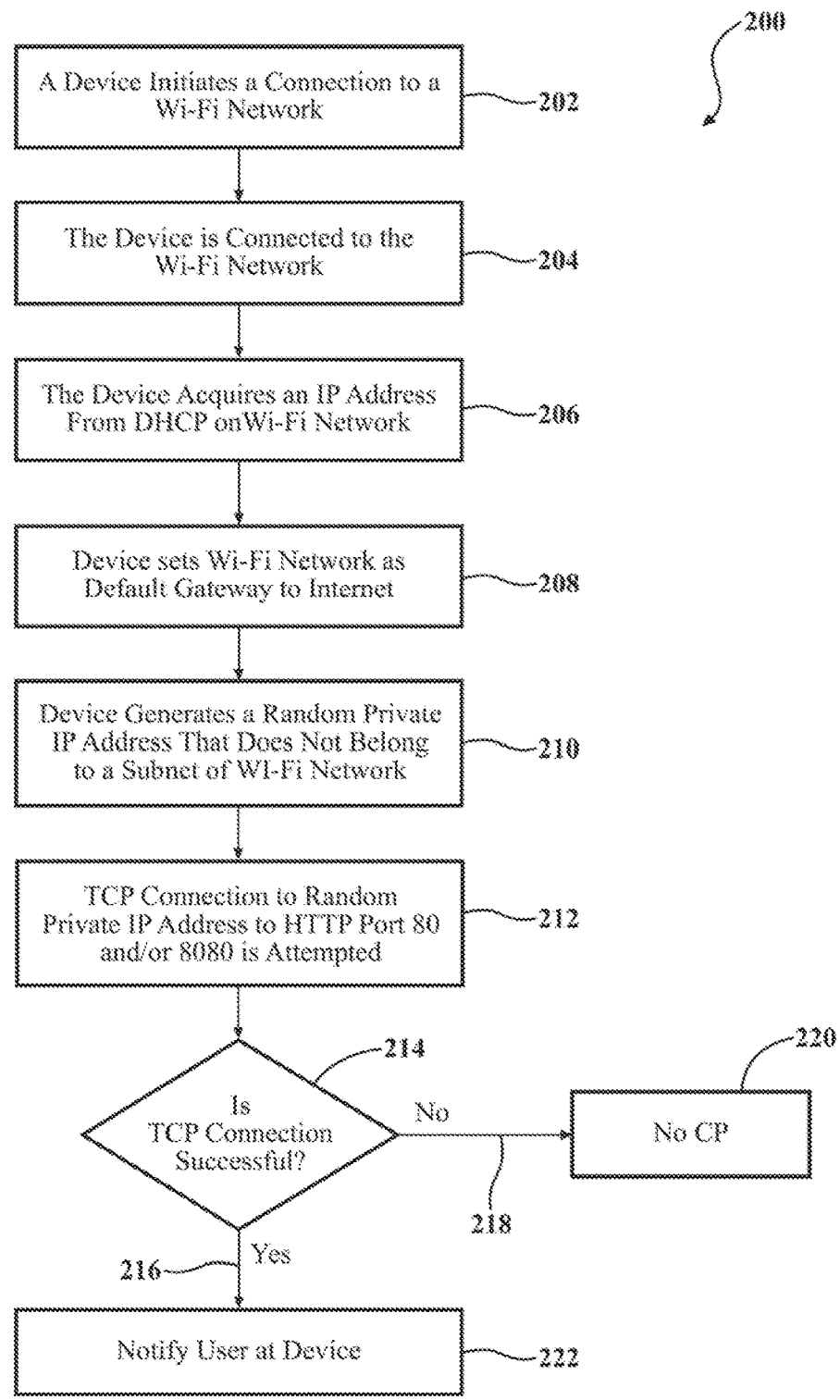
FIG. 2 is a flowchart of a method for detecting a captive portal network.

FIG. 2 is a flowchart of a method 200 for detecting a captive portal using the underlying behavior of the captive portal to detect the existence of a captive portal in a network. A device, such as a head unit on a vehicle, initiates 202 a connection to a Wi-Fi network. A Wi-Fi connection is completed 204. The device acquires 206 an IP address from a Dynamic Host Configuration Protocol (DHCP) on the Wi-Fi network. It should be noted that for the example described herein with reference to a head unit on an automotive vehicle, the head unit is a Wi-Fi STA which connects to an external Access Point (AP). However, there are other examples that may be implement the inventive subject matter herein without departing from the scope of the inventive subject matter. For example, for home or small office networks, the DHCP server usually runs on an AP that provides an IP to a connected STA. In a large office or enterprise network, the DHCP server may run on a wired back end network. In any implementation, the captive portal will run on the Wi-Fi AP.

The device sets the Wi-Fi network as a default gateway 208 in a routing table in order to reach the Internet. The device generates 210 a random private Internet Protocol (IP) address that does not belong to a subnet of the Wi-Fi network. The random private IP address, belonging to a different subnet, is generated to ensure that the generated IP address is within a predetermined range, for example, 10.0.0.0 to 10.255.255.255A TCP connection to the random private IP address is carried out 212 on HTTP Port: 80 and/or HTTP Port: 8080, Ports 80 and 8080 are well-known HTTP ports.

In a network without a captive portal, any traffic to this non-existent randomly generated IP address should get dropped. Also in a network without a captive portal, there will not be an HTTP server running on the non-existent randomly generated IP address. it is highly improbable that the Wi-Fi network is connected to another subnet, that the randomly generated private IP address is valid in any other connected subnet, and that there is an HTTP server running on the device. Also, due to the underlying behavior of a captive portal network, it is known that the captive portal network redirects any HTTP traffic, and therefore any TCP protocol traffic, meant for any destination IP address to the HTTP server running the captive portal login page. Therefore, a determination is made based on whether or not the TCP connection is successful 214.

As discussed earlier herein, there may be an HTTP server running on the same network, so with a randomly generated IP address in the same subnet, any attempted TCP connection may result in a connection to the wrong HTTP server. Therefore, attempting the TCP connection to a non-existent HTTP server on a random private IP address where it is ensured that no HTTP server is running, any successful connection is due to the existence of a captive portal that has hijacked the TCP connection and redirected it to its own login page. A successful TCP connection 216 indicates a captive portal has been detected. An unsuccessful TCP 218 connection indicates that the Wi-Fi network does not have a captive portal 220. Upon concluding the existence of a captive portal 216, an end user at the device may be notified 222. A notification may be, but is not limited to, a message displayed at the device and presented to a user of the device that the Wi-Fi network has a captive portal.

Using the method 200 described above, Operating System companies are not required to host special websites on the Internet which results in a cost savings associated with setting up and maintaining the website. The detection mechanism of the method described herein is based on a TCP connection and therefore is suitable for small embedded devices, such as wearables or Internet of Things (IOT) devices. The method 200 is completely based on TCP connection that is within a local network and not the Internet, making it fast and efficient. Also because the TCP connection does not rely on HTTP protocol exchange between a host and a hosted HTTP server for every Wi-Fi connection traffic to the Internet is reduced.

Figure 3:
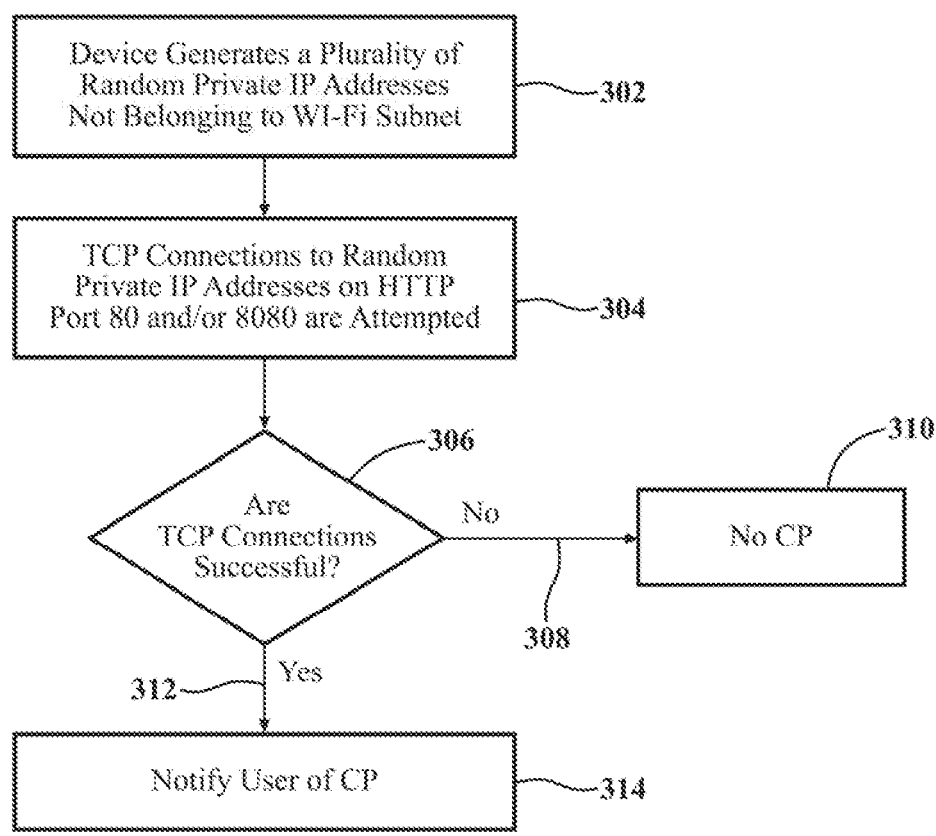
FIG. 3 is a flowchart of a method for verifying detection of a captive portal network.

FIG. 3 is a flow chart depicting a method 300 for verifying the result. Upon making a determination as to whether or not a TCP connection is successful, a TCP connection can be repeated with more than one randomly generated private IP addresses. The device generates 302 a plurality of random IP addresses not belonging to the Wi-Fi subnet. A TCP connection to each random IP address is attempted 304. A determination 306 is made as to whether or not the TCP connections are successful. Upon unsuccessful connections 308, a conclusion is made that there is no captive portal 310. Upon successful connections 312, a conclusion is made that a captive portal has been detected and an end user is notified 314 of the captive portal.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments. However, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations end/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A method for detecting a captive portal on a Wi-Fi network, the method carried out on a device having a processing unit including a non-transitory computer-readable storage medium configured to execute instructions of a software program, the method comprising the steps of:
   connecting to the Wi-Fi network;
   acquiring an Internet Protocol (IP) address from a dynamic host configuration protocol on the Wi-Fi network;
   setting the acquired IP address as a default gateway to Internet;
   generating, at the device, a random private IP address;
   attempting a TCP connection to the random private IP address on HTTP port:80, HTTP port:8080, or HTTP port:80 and HTTP port 8080;
   upon an unsuccessful TCP connection to the random private IP address, making a determination that a captive portal has not been detected; and
   upon a successful TCP connection to the random private IP address, making a determination that a captive portal has been detected.

2. The method as claimed in claim 1 wherein the random private IP address further comprises a random private IP address that is not associated with a subnet of the Wi-Fi network.

3. The method as claimed in claim 1 further comprising the step of notifying a user of the device that the Wi-Fi network has a captive portal.

4. The method as claimed in claim 3 wherein the step of notifying a user of the device further comprises displaying a message at the device indicating that a captive portal exists.

5. The method as claimed in claim 1 wherein the step of making a determination that a captive portal has been detected further comprises step of verifying the captive portal has been detected.

6. The method as claimed in claim 5 wherein the step of verifying the captive portal has been detected further comprises the steps of:
   generating, at the device, a plurality of random private IP addresses;
   attempting TCP connections to each of the plurality of random private IP addresses on HTTP port:80, HTTP port:8080, or HTTP port 80 and HTTP port:8080;
   upon an unsuccessful TCP connection, making a determination that a captive portal has not been detected; and
   upon successful TCP connections of each of the plurality of random private IP addresses, making a determination that a captive portal has been detected.

7. The method as claimed in claim 6 wherein the plurality of random private IP addresses further comprises each random private IP address in the plurality of random private IP addresses is not associated with a subset of the Wi-Fi network.

8. A non-transitory computer readable storage medium comprising a program, which, when executed by one or more processors, performs an operation comprising:
   connecting a device to a Wi-Fi network;
   acquiring, at the device, an Internet Protocol (IP) address from a dynamic host configuration protocol on the Wi-Fi network;
   setting the acquired IP address as a default gateway to Internet in a routing table at the device;
   generating, at the device, a random private IP address;
   attempting a TCP connection from the device to the random private IP address on HTTP port:80, HTTP port 8080, or HTTP port 80 and HTTP port:8080;
   upon an unsuccessful TCP connection, making a determination that no captive portal is associated with the Wi-Fi network; and
   upon a successful TCP connection, making a determination that a captive portal is associated with the Wi-Fi network.

9. The computer readable medium as claimed in claim 8 wherein the step of generating a random private IP address further comprises generating a random private IP address that is not associated with a sublet of the Wi-Fi network.

10. The computer readable medium as claimed in claim 8 further comprising the step of notifying a user of the device that the Wi-Fi network has a captive portal.

11. The computer readable medium as claimed in claim 10 wherein the step of notifying a user of the device further comprises displaying a message at the device indicating that a captive portal exists.

12. The computer readable medium as claimed in claim 8 wherein the step of making a determination that a captive portal is associated with the Wi-Fi network further comprises verifying the determination that a captive portal has been detected.

13. The computer readable medium as claimed in claim 12 wherein the step of verifying the determination that a captive portal has been detected further comprises the steps of:
   generating, at the device, a plurality of random private IP addresses;
   attempting TCP connections to each of the plurality of random private IP addresses on HTTP port:80, HTTP port:8080, or HTTP port:80 and HTTP port:8080;
   upon an unsuccessful TCP connection, making a determination that no captive portal is associated with the Wi-Fi network; and upon successful TCP connections of each of the plurality of random private IP addresses, making a determination that a captive portal is associated with the Wi-Fi network.

14. The computer readable medium as claimed in claim 13 wherein the step of generating, at the device, a plurality of random private IP addresses further comprises generating a plurality of random private IP addresses, each of which is not associated with a subnet of the Wi-Fi network.

15. A method for detecting a captive portal on a Wi-Fi network, the method carried out on a head unit of a vehicle, the head unit having a processing unit including a non-transitory computer-readable storage medium configured to execute instructions of a software program, the method comprising the steps of:

connecting the head unit to the Wi-Fi network;
acquiring, at the head unit, an Internet Protocol (IP) address from a dynamic host configuration protocol on the Wi-Fi network;
setting the acquired IP address as a default gateway to Internet on a routing table at the head unit;
generating, at the head unit, a random private IP address;
attempting a TCP connection between the head unit to the random private IP address on HTTP port:80, HTTP port:8080, or HTTP port:80 and HTTP port:8080;
upon an unsuccessful TCP connection, making a determination that no captive portal is associated with the Wi-Fi network; and
upon a successful TCP connection, making a determination that a captive portal is associated with the Wi-Fi network.

16. The method as claimed in claim 15 wherein the step of generating a random private IP address further comprises generating a random private IP address that is not associated with a subnet of the Wi-Fi network.

17. The method as claimed in claim 15 further comprising the step of notifying a user of the head unit that the Wi-Fi network has a captive portal.

18. The method as claimed in claim 17 wherein the step of notifying a user of the device further comprises displaying a message at the device indicating that a captive portal exists.

19. The, method as claimed in claim 15 further comprises the steps of:

generating, at the head unit, a plurality of random private IP addresses;
attempting TCP connections to each of the random private IP addresses in the plurality of random private IP addresses on port:80, HTTP port:8080, or HTTP port:80 and HTTP port:8080;
upon an unsuccessful TCP connection, making a determination that no captive portal is associated with the Wi-Fi network;
upon successful TCP connections of each of the plurality of random private IP addresses, verifying the determination that a captive portal is associated with the Wi-Fi network.

20. The method as claimed in claim 19 wherein the step of generating, at the head unit, a plurality of random private IP addresses further comprises generating a plurality of random private IP addresses, each of which is not associated with a subnet of the Wi-Fi network.

* * * * *